United States Patent [19]

Hertel

[11] Patent Number: 4,634,071
[45] Date of Patent: Jan. 6, 1987

[54] LIGHT TIGHT FILM CARTRIDGE WITH FLOATING LIGHT SEAL

[75] Inventor: Heinz E. Hertel, Mt. Prospect, Ill.

[73] Assignee: Bell & Howell Company, Chicago, Ill.

[21] Appl. No.: 787,836

[22] Filed: Oct. 16, 1985

[51] Int. Cl.$^4$ .......................... G03B 1/04; G03B 17/26
[52] U.S. Cl. ..................................... 242/71.1; 354/277
[58] Field of Search ............... 242/71.1, 71.2, 71.7; 354/277; 352/78 R; 206/409

[56] References Cited

U.S. PATENT DOCUMENTS

| | | | |
|---|---|---|---|
| 773,382 | 10/1904 | Folmer | 354/277 |
| 851,281 | 4/1907 | Drake . | |
| 1,459,914 | 6/1923 | Knorr | 242/71.1 |
| 2,476,996 | 7/1949 | Nebel | 242/71.1 |
| 2,484,248 | 10/1949 | Roehrl | 242/71.1 |
| 2,834,271 | 5/1958 | Booth | 354/277 |
| 3,190,577 | 6/1965 | Allen et al. | 242/71.1 X |
| 3,537,376 | 11/1970 | Fleming et al. | 354/277 |
| 4,008,483 | 2/1977 | Swift et al. | 354/277 |
| 4,034,929 | 7/1977 | Ebner, Jr. | 242/71.1 |
| 4,068,247 | 1/1978 | Bouwer et al. | 242/71.1 X |
| 4,272,035 | 6/1981 | Sherman et al. | 242/71.1 |

Primary Examiner—Stuart S. Levy
Assistant Examiner—Thomas R. Hannor

[57] ABSTRACT

A light tight cartridge for dispensing a light sensitive film strip wound on a spool comprises a container body having an exit port formed between spaced side walls in a transverse wall therebetween for accommodating a film strip extending outwardly of the container on a tangential film path which angularly changes relative to the container as the amount of the film on the spool is varied. A floating light seal is mounted in an exit port enclosure for shifting movement in a direction generally transverse to the film path and continuously provides a light sealing engagement with opposite surfaces of the film strip preventing outside light from entering the container body. The exit port enclosure and floating light seal cooperate to permit relative movement of the floating light seal in a direction generally normal to the path of the film and thereby accommodate different angular paths of film travel from the internal spool toward a fixed locational relationship such as an external film roller.

20 Claims, 6 Drawing Figures

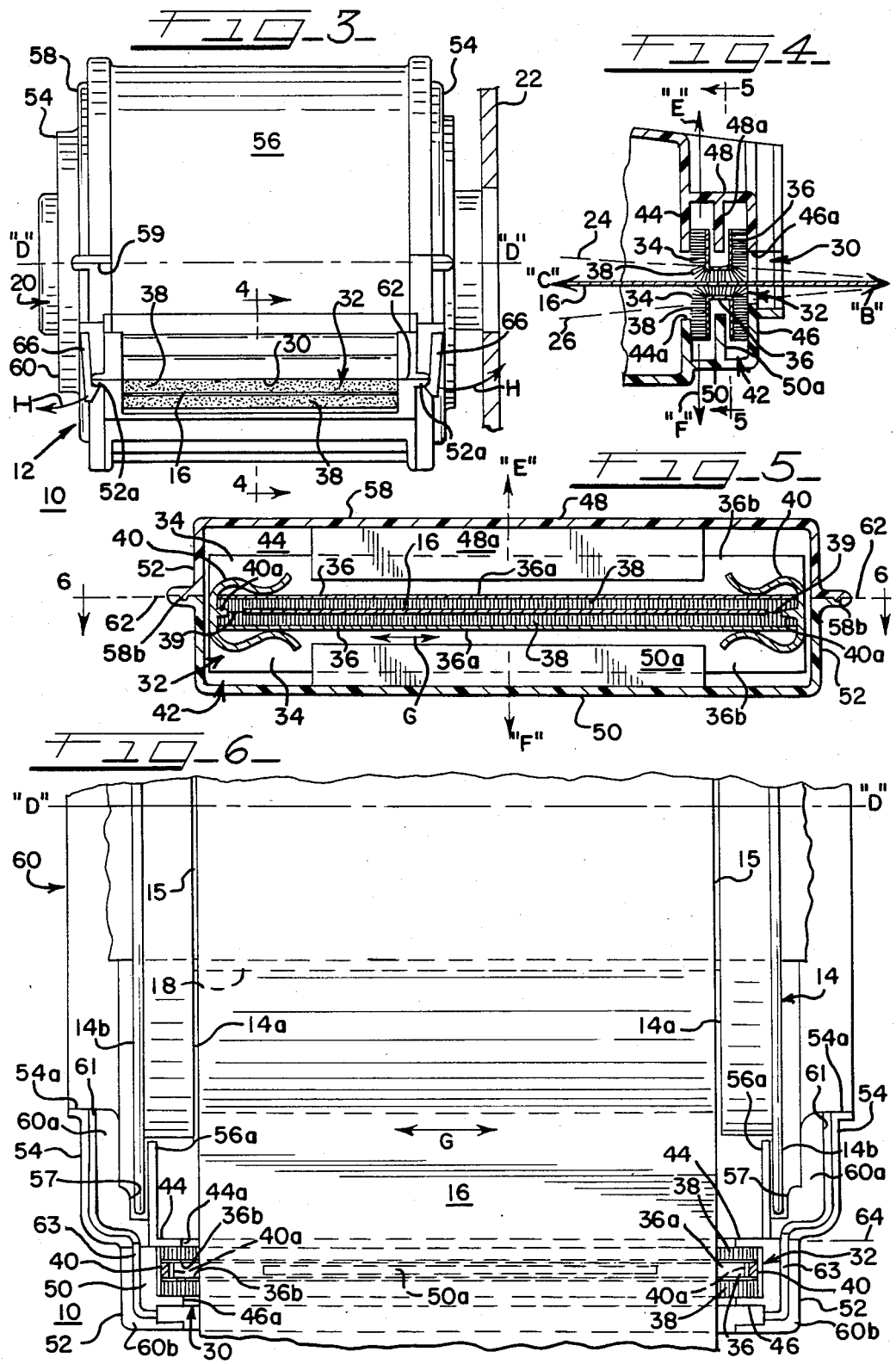

LIGHT TIGHT FILM CARTRIDGE WITH FLOATING LIGHT SEAL

BACKGROUND OF THE INVENTION

1. Field of the Invention

The present invention relates to a new and improved light tight film cartridge with a floating light seal for dispensing a light sensitive film strip wound upon a spool contained in the cartridge. In particular, the cartridge is especially adapted for use with high speed type film used in microimage recorders and the like and is particularly well suited for use in the microimage recording system as disclosed in U.S. patent application Ser. No. 787,812 filed Oct. 15, 1985, and incorporated herein by reference.

2. Description of the Prior Art

Over the years, a wide variety of light tight seals and film dispensing cartridges with various types of seals have been developed. The following United States patents and foreign patent are concerned with providing light tight sealing between film and film strips and various plates, holders and/or containers and cartridges for the film;

U.S. Pat. No. 773,382—Folmer
U.S. Pat. No. 851,281—Drake
U.S. Pat. No. 2,476,996—Nebel
U.S. Pat. No. 2,484,248—Roehrl
U.S. Pat. No. 3,190,577—Allen et al
U.S. Pat. No. 3,537,376—Fleming et al
U.S. Pat. No. 4,068,247—Bouwen et al
U.S. Pat. No. 4,272,035—Sherman et al
U.S. Pat. No. 4,034,929—Ebner Jr.
German Pat. No. 1,232,460

OBJECTS OF THE PRESENT INVENTION

It is an object of the present invention to provide a new and improved light tight film cartridge with a floating light seal and more particularly to provide a new and improved cartridge of the character described especially well adapted to accommodate different angular film paths as a film strip is wound or unwound tangentially from an internal spool contained in the cartridge.

Another object of the present invention is to provide a new and improved floating light seal for a film cartridge and in particular a light seal with produces minimal friction against the film as the angular film path changes.

Another object of the present invention is to provide a new and improved film cartridge of the character described especially well adapted for use with high speed film in particular, a dry silver type film commonly used in microimage recording apparatus.

It is another object of the present invention to provide a new and improved film cartridge of the character described which is relatively low in cost, simple in construction and operation and extremely light tight so as to accommodate extremely light sensitive film.

BRIEF SUMMARY OF THE INVENTION

The foregoing and other objects and advantages of the present invention are accomplished in an illustrated embodiment thereof comprising a light tight film cartridge for containing a light sensitive film strip wound upon a spool mounted for rotation in the cartridge body around an axis of rotation extending between central portions of a pair of opposite body sidewalls. The cartridge body includes an exit port structure formed in a transverse wall parallel of the spool axis and extending between the sidewalls. The film strip is movable on a tangential film path relative to the film wound on the spool, which path extends outwardly through the exit port structure toward an external roll or the like fixedly positioned relative to the cartridge. A floating light seal is mounted in the exit port structure for shiftable movement relative to the spool axis for continuously engaging opposite surfaces of the film strip and accommodating a range of angular film paths occupied by the film strip extending outwardly from the cartridge through the exit port structure. The exit port and floating light seal cooperate to provide limited movement of the floating light seal in a direction generally normal to the film path and accommodate angularly different travel paths of the film strip as the film is wound or unwound tangentially of the spool during use.

BRIEF DESCRIPTION OF THE DRAWINGS

For a better understanding of the present invention, reference should be had to the following detailed description taken in conjunction with the drawings, in which:

FIG. 3 is a front elevational view of the light tight film cartridge and floating light seal looking in the direction of arrows 3—3 of FIG. 1 and again assuming that the cartridge halves are secured together rather than being separated as shown in FIG. 1;

FIG. 4 is a fragmentary cross-sectional view taken substantially along lines 4—4 of FIG. 3 illustrating an exit port structure and floating light seal in accordance with the features of the present invention;

FIG. 5 is a cross-sectional view taken substantially along lines 5—5 of FIG. 4; and FIG. 6 is a fragmentary cross-sectional view taken substantially along lines 6—6 of FIG. 5.

DESCRIPTION OF A PREFERRED EMBODIMENT OF THE INVENTION

Figure 1:
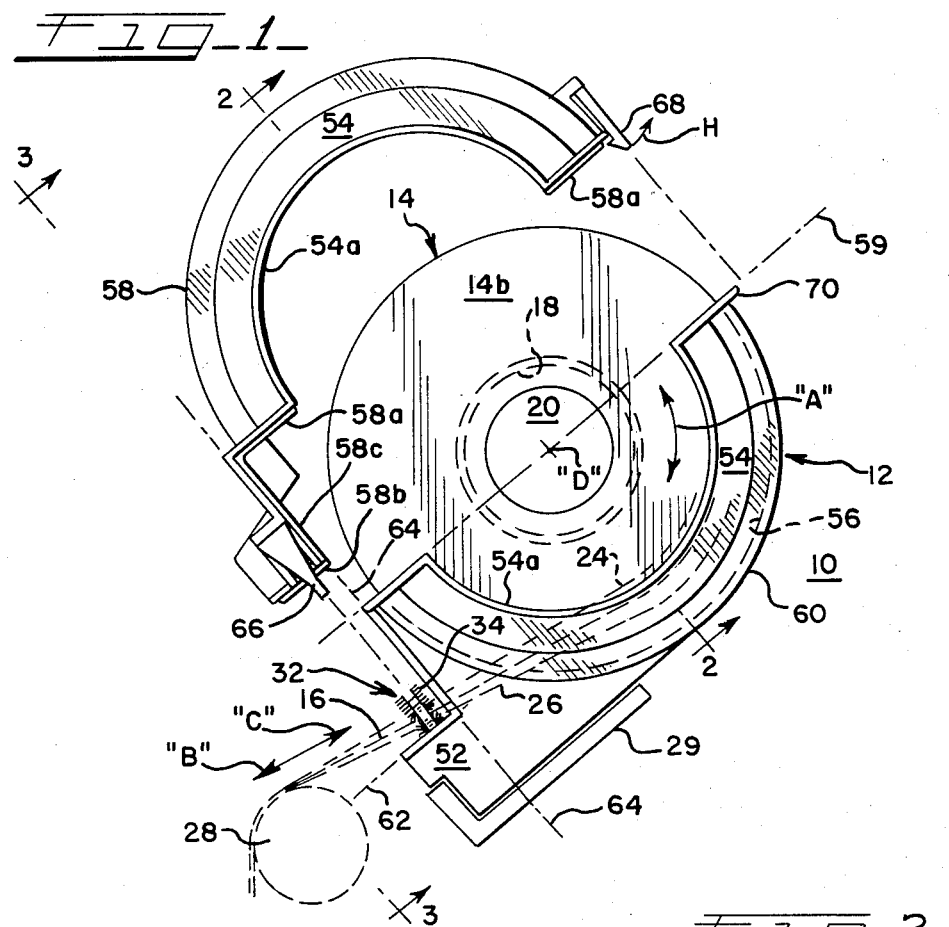
FIG. 1 is a side elevational view of a new and improved light tight film cartridge with a floating light seal constructed in accordance with the features of the present invention and illustrated with halve portions of the cartridge body separated from one another as when loading a rotatable spool containing a supply of light sensitive film strip.

Referring now more particularly to the drawings therein is illustrated a new and improved light tight film cartridge having a floating light seal and referred to generally by the reference numeral 10. The film cartridge 10 includes a body 12 preferably formed of black molded plastic material and adapted to contain and enclose in a light sealed environment a film spool 14 for containing an elongated film strip 16 of extremely light sensitive type film wound upon a hollow tubular sleeve 18 of the film spool.

The spool is adapted to be driven within the body 12 of the container 10 in either direction as indicated by the arrow A by a rotatable drive spindle mechanism 20 projecting outwardly of a chassis or base 22 of a microimage recording apparatus such as disclosed in the afore-mentioned copending U.S. patent application, Ser. No. 787,812 filed 10/15/85. As disclosed in this copending U.S. patent application, the drive spindle 20 is powered to rotate the supply spool 14 within the cartridge body 12 to wind or unwind the elongated film strip 16 upon the hollow central sleeve 18 of the spool.

As indicated in FIGS. 1 and 4, the film strip 16 is fed or advanced outwardly of the cartridge body 12 in the direction of an arrow B or may move inwardly into the cartridge in the direction of the arrow C. During such movement the film travels on a film path that varies in an angular range as indicated by the dotted lines 24 and 26. The exact film path is determined by the amount of film contained on the film spool 14 and the position of a film exit roll 28 which is normally in a fixed location relative to an axis of rotation D—D of the film spool and the drive spindle engaged to rotate the spool. The film strip is wound or unwound from an ever changing supply of film on the spool tangentially thereof and the angular variation in the film path is generally dependent upon the amount of film carried on the spool at any particular instant.

The film cartridge body 12 is movably secured against rotation when the drive spindle is rotatively engaged with the spool 14 by a bracket 29 or other structure projecting outwardly from the base or chassis 22. The interengagement between the cartridge body 12 and the guide bracket 29 insures proper positioning of the film cartridge in relation to the exit feed roll or roller 28 as shown in FIG. 1 and precludes rotation of the cartridge body with the drive spindle 20.

In accordance with the present invention, a portion or segment of the film strip 16 extending between the supply spool 14 and the externally positioned roller 28 passes through an exit port 30 formed in an outer wall segment of the cartridge body and a shiftable, floating light seal assembly 32 (FIGS. 4 and 5) is mounted in the cartridge body adjacent the exit port to provide a light tight seal between opposite surfaces of the film strip as the film leaves or enters the enclosure of the cartridge body 12.

In accordance with the features of the present invention, the floating light seal 32 comprises a pair of elongated sealing elements 34 of generally U-shaped transverse cross-section and disposed adjacent opposite surfaces of the film strip 16 for providing light tight seals extending transversely across the length of the film strip between the spool 14 and the external roller 28. Each elongated sealing element is formed with a relatively stiff or rigid base 36 of thin metal or plastic having a flat or planar narrow bight portion 36a in parallel facing relation to an adjacent surface of the film strip. Parallel leg portions 36b integrally join opposite edges of the bight portion 36a thereby providing a relatively stiff structure for supporting a layer of black velvet-like light sealing material 38 formed with a plurality of small, thin, flexible filaments closely spaced together and projecting generally normal to and outwardly of the outside surface portions of the U-shaped metal element 36.

As illustrated in FIGS. 4 and 5, outer end portions of the filamentary material are designed to softly and flexibly engage the opposite surfaces of the film strip 16 extending between the parallel bight segments 36a of the sealing elements 34. The flexible filaments of the velvet-like material are preferably formed of relatively soft plastic material and are small enough in diameter to be readily deflectable upon engagement with the surface of the film so as not to scratch or mar the surface as the film moves along the film path.

As shown in FIG. 5, along opposite, outside longitudinal edges of the film strip 16, outer end portions of the flexible filaments on the respective upper and lower sealing elements 34 are long enough to engage one another directly and form light tight edge sealing areas 39 to prevent light from entering the cartridge body 12 around the edges of the film strip.

Outer end portions of the small flexible filaments of the velvet-like material 38 are biased toward one another by a pair of resilient clip elements 40 of generally U-shaped configuration including S-curve shaped legs engageable with the bight portions 36a of the respective metal U-shaped base elements 36. The clips 40 resiliently urge the elongated light sealing elements 34 toward one another to provide an effective light seal with the opposite surfaces of the film strip 16. The clips 40 are provided with short spacing segments 40a projecting inwardly between the S-curved legs and these spacers provide a finite amount of resilient spacing accommodation between the outer ends of the filament members of upper and lower strips of velvet-like material 38. The spacers 40a of the resilient clips also serve to prevent the filamentary material from being crushed or flattened by the pressure exerted by the curved spring leg portions of the resilient clips 40. The clips act to secure the upper and lower elongated sealing elements 34 in parallel relation to act as a unitary and shiftable light sealing assembly 32 for light sealing engagement with the opposite surfaces of the film strip 16 and with the opposite longitudinal edges thereof.

In accordance with an important feature of the present invention, the floating light seal 32 is mounted for shifting or floating movement up or down relative to the path of the film strip as shown in FIG. 4 by the arrows E and F. When the film strip 16 changes angular position within an angular range represented by the lines 26 and 24 the film path moves toward the upper limit 24 as the amount of film on the spool 14 is reduced. The floating light seal 32 shifts upwardly relative to a mean position as indicated by the arrow E in a direction generally transverse or normal to the path of the film. Conversely, when the path of film travel shifts angularly downwardly the lower limit indicated by the line 26, the floating light seal 32 moves downwardly in the direction of the arrow F.

As illustrated in FIG. 5, the elongated sealing elements 34 of the floating light seal 32 are longer than the transverse width of the film between opposite longitudinal side edges so that a light tight seal is continuously maintained along the opposite edges of the film strip in the areas 39. The floating light seal is dimensioned to be movable longitudinally in the direction of arrows G (FIG. 5) as the film may move slightly from edge to edge when winding or unwinding on the film spool 14 between the inside annular sidewalls 14a thereof as shown in FIG. 6. A small amount of clearance 15 (FIG. 6) between the outer edges of the film strip 16 and the inside faces 14a of the film spool permits limited lateral adjustment of the film strip as the film strip is wound or unwound on the sleeve 18 and this minimizes any binding between the edges of the film and the spool. As indicated by the arrows G in FIGS. 5 and 6, limited longitudinal shifting of the floating light seal assembly 32 is permitted so as to reduce the possibility of edge damage to the film strip.

In accordance with the present invention, the exit port 30 comprises an elongated slot generally parallel of the spool axis D—D (FIG. 3) formed in an outer wall section of the container body 12. As best shown in FIGS. 4 and 5, the container body is provided with an integral, elongated exit chamber 42 adjacent the exit port having parallel, generally flat inner and outer walls 44 and 46 spaced on opposite sides of the floating light seal 32. As best shown in FIGS. 4 and 6, the inner wall 46 has an elongated film slot 44a and the outer wall 46 has an elongated film slot 46a aligned therewith for accommodating the film strip 16. The chamber 42 is provided with upper and lower walls 48 and 50 integrally joined by opposite end walls 52 forming a complete, light tight enclosure for the foating light seal 32 around the film strip 16. Inside opposing faces of the end walls 52 provide stops for limiting longitudinal movement of the floating light seal 32 in the direction of the arrow G as the film strip moves in or out of the container body 12.

In accordance with the features of the present invention, the facing inside wall surfaces of the inner wall 44 and the outer wall 46 are adapted to be lightly engaged by the many flexible filaments of the filamentary material 38 on the sealing elements 34 to form a light tight seal therebetween and to maintain the seal even though the floating light seal assembly 32 is movable up and down as indicated by the arrows E and F as the angle of the film path changes Engagement between the outer end portions of the multiple filaments and the inside facing surfaces of the walls 44 and 46 also serves to permit limited movement of the floating light seal 32 in a direction generally parallel of the film path as indicated by the arrow heads B and C. In order to prevent the filaments of the filamentary material 38 from being crushed or permanently deflected by rapid travel of the film strip into or out of the container body 12, an additional travel limit is provided by a pair of elongated, integral stops 48a and 50a, projecting upwardly and downwardly, respectively, from the upper and lower walls 48 and 50 of the exit chamber 42. As shown in FIGS. 5 and 6, the stops 48a and 50a terminate at opposite longitudinal ends spaced apart inwardly of the adjacent inside surfaces of the end walls 52 so as to clear the resilient clips 40.

As shown in FIGS. 4 and 6, opposite side surfaces of the stops 48a and 50a are adapted to engage a facing inside surface 36b of the leg of a respective U-shaped base element 36 to limit travel of the floating light seal assembly 32 in a direction generally parallel of the film path. As viewed in FIGS. 4 and 5, it will be seen that the filamentary material 38 on the U-shaped, elongated rigid elements 36 provide light tight sealing against opposite surfaces of the film strip 16 and against the facing inside wall surfaces of the inner wall 44 around the film slot 44a and the outer wall 46 around the film slot 46a. Along opposite edges of the film 16, the resilient elements of the velvet-like material 38 engage one another to seal the edge areas 39 and the result is a floating light assembly seal 32 mounted in the exit port chamber 42 which prevents substantially all avenues of possible light leakage and insures that highly sensitive, high speed, film can be utilized successfully in the cartridge 10 without light exposure damage to the film strip.

As previously indicated, the cartridge body 12 is preferably formed of molded plastic material that is black in color for best absorbing light and the body includes a pair of parallel, opposite sidewall sections 54 generally normal to the axis of spool rotation D—D. Each sidewall 54 is formed with a relatively large diameter, circular opening 54a at the center concentrically aligned with the rotational axis of the spool in order to permit direct driving engagement between a drive spindle 20 and the spool sleeve 18 within the container body 12. The opposite sidewalls are integrally joined to a scroll-like transverse wall 56 extending around the periphery of the sidewalls and the walls of the exit chamber 42 are integral with the transverse wall adjacent a front portion thereof.

Figure 2:
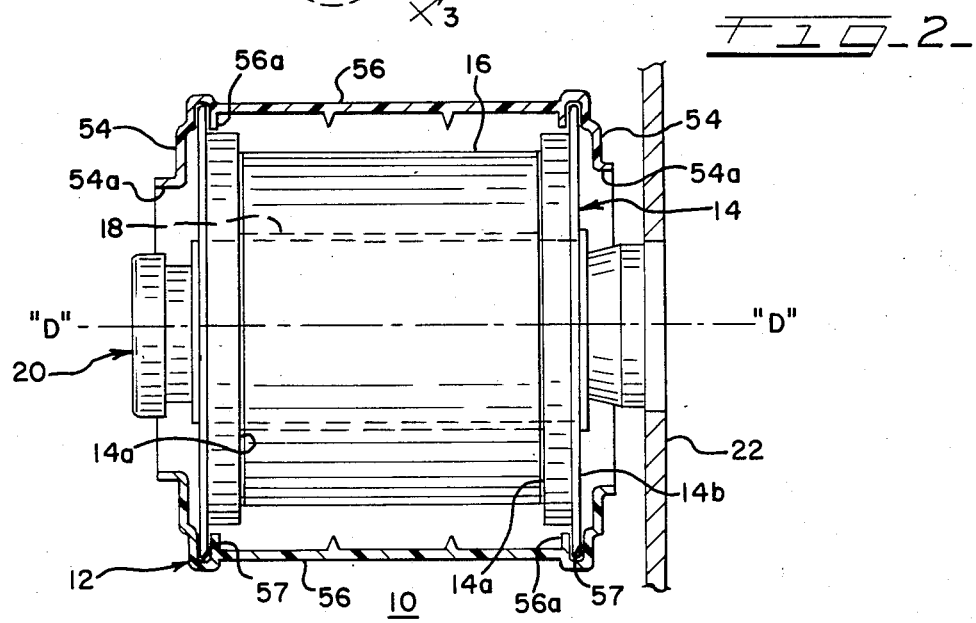
FIG. 2 is a transverse cross-sectional view taken substantially along lines 2—2 of FIG. 1 and assuming that the separate halves of the cartridge body are secured together.

As illustrated in FIG. 2, adjacent the juncture of the opposite sidewalls 54 and the transverse wall 56, there is provided a pair of inwardly projecting annular rings 56a defining grooves 57 which serve as circular guide tracks for adjacent peripheral edge portions 14b of the spool 14 extending radially outwardly at opposite ends of the central spool sleeve 18. As shown in FIGS. 2 and 6, the circular, outer edge portions 14b of the spool and the grooves 37 formed adjacent the inside ribs 56a provide a light tight annular seal around the outer edges of the spool even as the spool is rotated within the container body 12.

In accordance with another aspect of the present invention, the container body 12 is preferably formed in two separate and detachable halve members or halves 58 and 60, and the opposite sidewalls 54 are bisected by a diametrically aligned joint plane 59 shown in FIG. 1 which extends through the spool axis D—D. The lower member 60 is formed with upwardly facing joint surfaces 60a having a groove 61 formed therein for accommodating a downwardly projecting rib 58b formed on the mating surface of the upper member 58 to provide a light tight seal when the upper and lower halves are joined together. Similarly, the exit chamber 42 is bisected by a joint plane 62 spaced below and parallel of the upper diametrical joint plane 59. As illustrated best in FIG. 6, the lower member 60 is formed with lower joint surfaces 60b having grooves 63 formed therein to accommodate a depending rib 58b on the upper member 58 to provide a light tight seal along the lower joint plane 62 when the upper and lower halves of the container body are joined together. The joint line between the upper member 58 and lower member 60 of the cartridge body also includes a frontal joint plane 64 perpendicular to the diametrical joint plane 59 and the lower joint plane 62. The frontal joint plane 64 is positioned behind or inwardly of the floating light seal 32 and a groove is provided on forwardly facing joint surfaces of the lower member 60 to accommodate a rib 58c on the upper member 58 so as to provide a continuous light tight seal between the halve members when they are joined together forming a light tight enclosure for the film stip 16 on the spool 14.

In order to secure the upper and lower halves together, the cartridge body 12 is provided with a plurality of deflectable latches including a pair of downwardly projecting latch fingers 66 integrally formed on upper portions of the exit chamber end walls 52 to span the lower joint plane 62 and latchingly engage outwardly projecting lips 52a at the upper edge of the lower portion of the end walls 52 best shown in FIG. 3. In order to unlatch the members 58 and 60 for separation the fingers 66 are deflected outwardly as indicated by the arrows H and the upper halve member 58 can then be detached following the release of a single rear latch finger 68 formed on the central portion of the transverse wall 56 and adapted to latchingly engage a lip 70 on the lower member 60 as shown.

Although the invention has been described in terms of a preferred embodiment, it will be obvious to those skilled in the art that many alterations and modifications may be made weithout departing from the invention. Accordingly, it is intended that all such alterations and modifications be considered as within the spirit and scope of the invention as defined by the appended claims.

I claim:

1. A light tight, container for a light-sensitive film strip wound on a spool, comprising:

a container body having a pair of opposite sidewalls and a transverse wall extending between the peripheries of said sidewalls for enclosing said spool and film strip around an axis of rotation of said spool extending between central portions of said sidewalls and normal thereto;

exit port means formed in said transverse wall parallel of said axis between said sidewalls for passing said film strip outwardly of said container as said film is unwound from said spool on a tangential film path upon relative rotation of said spool in said body; and floating light seal means mounted in said exit port means for shiftable movement relative to said axis for continuously sealingly engaging opposite surfaces of said film strip extending from said container for preventing outside light from entering said body adjacent said film surfaces, said exit port means and said floating light seal means including limit means for permitting relative movement of said floating light seal means in a direction generally normal to said film path to accommodate different angular paths of travel of said film strip between said spool and a position exteriorly of said container in fixed locational relationship with said spool axis.

2. The container of claim 1 wherein said floating light seal means comprises a pair of elongated sealing elements extending transversely across and parallel of adjacent opposite surfaces of said film strip extending through said exit port means.

3. The container of claim 2 wherein each of said elongated sealing elements comprises a rigid member having a flat surface facing and spaced from the adjacent surface of said film strip and a plurality of small flexible filaments of light absorbing color projecting outwardly of said flat surface for light sealing engagement with the adjacent moving surface of said film strip.

4. The container of claim 3 including resistant means biasing said rigid members toward one another to engage flexible outer end portions of said filaments against said opposite surfaces of said film.

5. The container of claim 3 wherein said resilient means includes a resilient spacer element between said rigid member for limiting the minimal spacing therebetween.

6. The container of claim 3 wherein each of said sealing elements comprises a rigid member of generally U-shaped transverse cross-section, and wherein said flat surface comprises a bight portion of said member which includes a spaced apart pair of legs projecting outwardly away from said film strip along opposite edge of said bight portion.

7. The container of claim 6 wherein said elongated projection has a thickness less than the spacing between said spaced apart legs for permitting limited travel of said rigid member in a direciton generally parallel of said film strip passing out through said exit port means.

8. The container of claim 7 wherein engagement between an inside surface of a leg of a rigid member against an adjacent side face of an elongated projection serves to limit the movement of said rigid members in a direction generally parallel of said film strip passing through said exit port means.

9. The container of claim 6 wherein each of said elongated projections includes an outer end surface facing said bight portion of an adjacent rigid member, said outer end surfaces of said projection spaced apart by a distance greater than the spacing between outside faces of said bight portions of said rigid members for permitting limited travel of said rigid members in a direction generally normal to said film strip passing through said exit port means.

10. The container of claim 9 wherein engagement of an outer end surface of one of said elongated projections and a facing bight portion of an adjacent rigid member serves to limit the movement of said rigid members in a direction generally normal to said film strip passing through said port means.

11. The container of claim 6 wherein said limit means includes an elongated projection extended from said transverse wall spaced apart intermediately between said spaced apart legs of each rigid member of said floating light seal means.

12. The container of claim 11 wherein a plurality of said small flexible filaments are mounted to project outwardly from opposite sides of said spaced apart legs of each rigid member of said floating light seal means.

13. The container of claim 12 wherein said exit port means includes an inner wall and an outer wall defining a compartment for said floating light seal means, said inner and outer walls having aligned film slots formed therein for passing said film strip between said spool and the exterior of said container through said floating light seal means, said flexible filaments on said legs of said rigid member forming a light seal between said floating light seal means and said inner and outer walls on opposite sides of light seals formed between said flexible filaments on said bight portion of said rigid member and said opposite surfaces of said film strip passing through said slot.

14. The container of claim 13 wherein said limit means further includes engagement of said flexible filaments on said legs of said rigid members with a facing surface of one of said inner and outer walls of said compartment for limiting travel of said floating light seal means in said direction parallel of said film travel out of said container.

15. The container of claim 14 wherein said film slots are slightly longer than the width of said film strip and are wider than the thickness of said film strip for accommodating said different angular paths of travel of said film strip.

16. The container of claim 15 wherein said body comprises a pair of detachably interconnected separate members formed of molded plastic material, each of said halves including portions of said sidewalls and said transverse wall.

17. The container of claim 16 wherein said halves are joined together along on a diametrial plane bisecting said sidewalls and are joined on a transverse plane parallel of said spool axis dividing said exit port means on said transverse wall.

18. The container of claim 17 including a plurality of deflectable clamping elements for securing said members together at said joining planes.

19. The container of claim 18 wherein a pair of said deflectable clamping elements are provided outwardly of opposite ends of said floating light seal means.

20. The container of claim 18 wherein said diametrical joint plane and said transverse wall joint plane are parallel.

* * * * *